Figure 1:
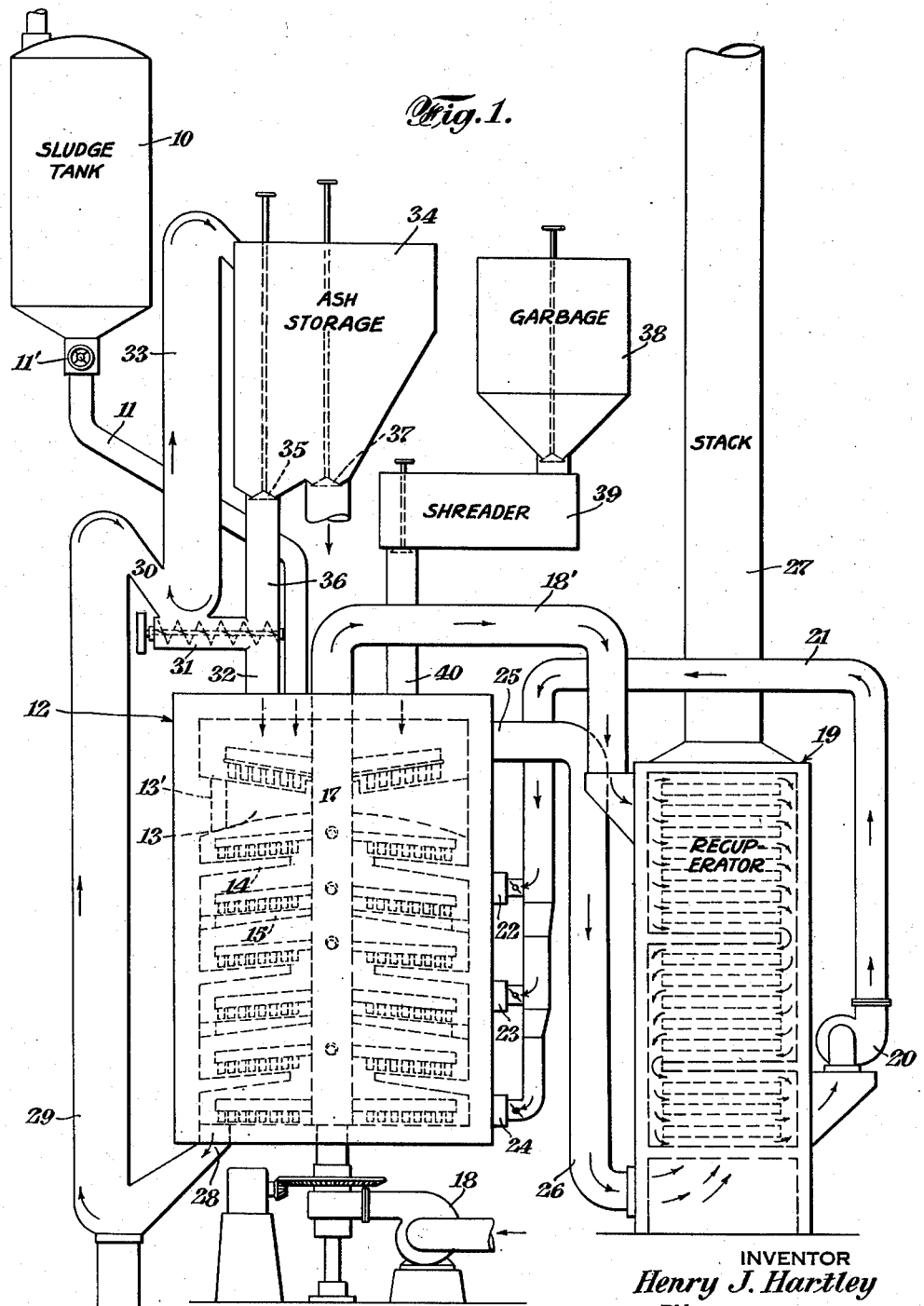

Aug. 2, 1938.  H. J. HARTLEY  2,125,720
INCINERATION
Original Filed March 31, 1936   2 Sheets-Sheet 1

INVENTOR
*Henry J. Hartley*
BY
*Ward Crosby & Neal*
ATTORNEYS

Aug. 2, 1938.     H. J. HARTLEY     2,125,720
INCINERATION
Original Filed March 31, 1936   2 Sheets-Sheet 2

INVENTOR
Henry J. Hartley
BY
Ward Crosby & Neal
ATTORNEYS

Patented Aug. 2, 1938

2,125,720

UNITED STATES PATENT OFFICE 2,125,720

INCINERATION

Henry J. Hartley, Hastings on Hudson, N. Y., assignor to Nichols Engineering & Research Corporation, New York, N. Y., a corporation of Delaware Application March 31, 1936, Serial No. 71,842
Renewed July 17, 1937

9 Claims. (Cl. 110—12)

This invention relates to processes and apparatus for incinerating sewage sludge or the like, and other waste materials.

The invention in certain of its phases embodies improvements in a method and apparatus disclosed in the patent to Dudley Baird and Robert W. Rowen, No. 2,015,050, granted September 17, 1935. The features of this invention are particularly adapted to relatively small installations for the incineration of sewage sludge for towns and villages where the quantity of material to be incinerated is insufficient to justify the expense of sewage disposal with incineration equipment heretofore proposed or used.

In accordance with the above mentioned Baird et al. patent, it is contemplated that the raw sewage shall be suitably treated as by well-known precipitation or sedimentation processes and then passed through vacuum filters or other dewatering apparatus, after which the solid filter cake or the like is introduced into a multiple hearth furnace, dried and thoroughly incinerated, with the elimination of organic matter and all odors. However, in accordance with the present invention, I have devised suitable apparatus with which the sludge resulting from the precipitation, sedimentation or other preliminary processes, and while still containing such a large water content that it is substantially liquid or capable of being pumped, may be treated for the elimination of the water and incinerated without resorting to the expense or difficulties of using filters or other mechanical means to separate the excessive water from the solid substances. In a preferred embodiment of my invention, although the invention is not necessarily limited thereto, I provide means for introducing the substantially liquid sludge directly into a unitary multiple hearth furnace structure within which the operations of eliminating the excessive water content, drying and incineration, may be all carried out.

According to one embodiment of my invention, the sewage sludge ash preferably while still hot as it comes from the incinerating hearths of the furnace, is mixed with the liquid or semi-liquid sewage sludge to absorb the latter, thus forming a solid or semi-solid mixture having a greatly extended surface area from which evaporation of moisture may be economically effected, the mixture also being of such consistency that it may be gradually rabbled or otherwise advanced at the desired rate over the hearths in a multiple hearth furnace.

Various further and more specific objects, features and advantages will clearly appear from the detailed description given below taken in connection with the accompanying drawings which form a part of this specification and illustrate merely by way of example a preferred form of the apparatus of the invention.

The invention consists in such novel features, arrangement and combinations of parts as may be shown and described in connection with the apparatus herein disclosed, and also such novel methods and combinations of method steps as are disclosed and described herein.

Figure 2:
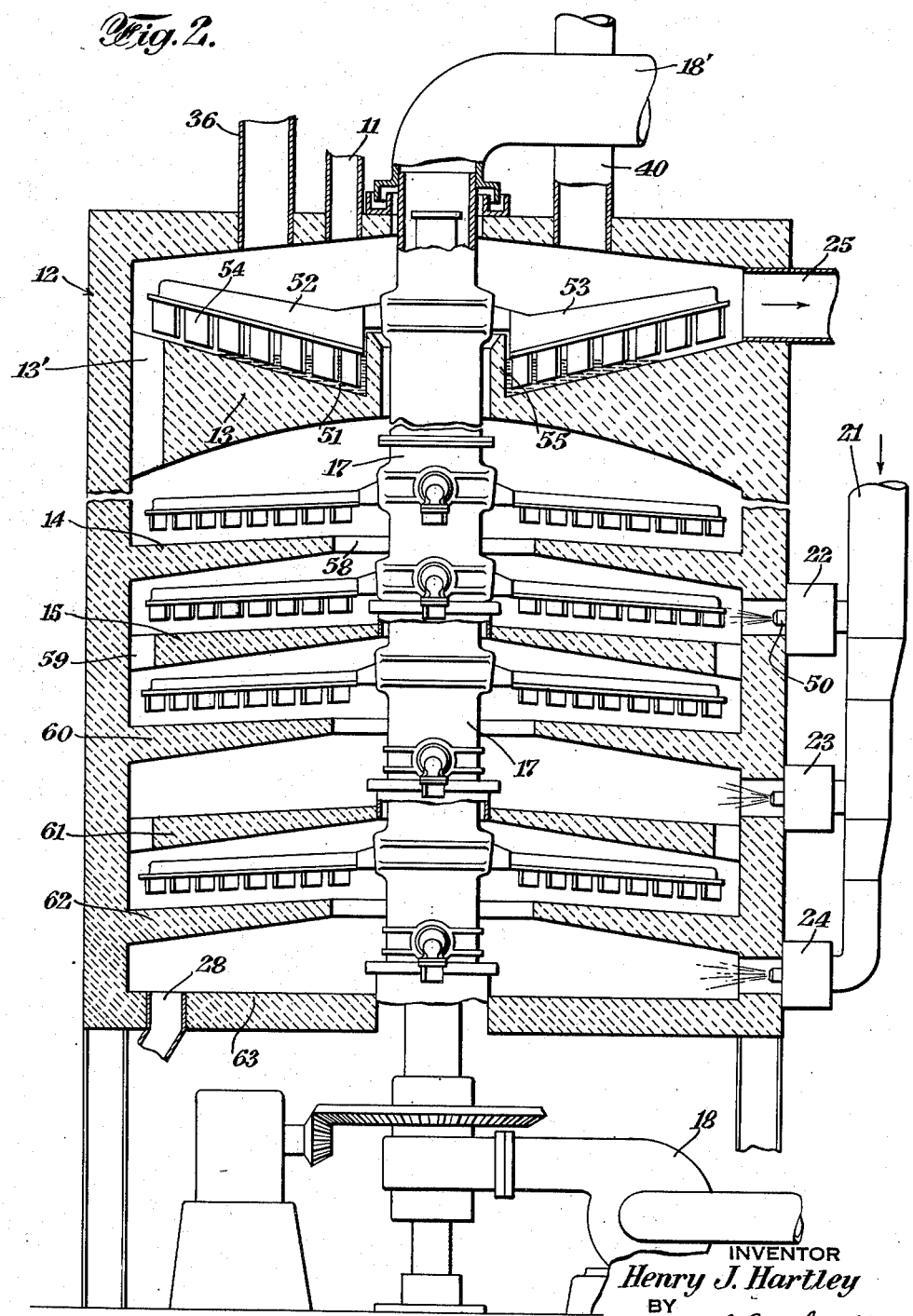

In the drawings, Fig. 1 illustrates one form of apparatus embodying the invention and in which the process of the invention may be carried out; and Fig. 2 is a vertical sectional view partly broken away, showing further details of the furnace structure comprised in the apparatus of Fig. 1.

With the equipment as shown in Fig. 1, the sewage sludge to be incinerated may be received in a tank 10. This sludge may for example comprise raw settled sludge run from a primary sedimentation tank, and containing in the neighborhood of from 90 to 98% of water, for example, or the material received in tank 10 may comprise digested sludge from Imhoff tanks or separate digestion tanks, and containing in the neighborhood of from 86 to 95% of moisture. Or the material to be treated may comprise activated sludge from final sedimentation tanks or mixtures of raw and activated sludge, or chemically precipitated sludge.

From tank 10 the sludge may be admitted to a conduit 11 at a desired rate, adjusted for example by valve 11', the conduit serving to convey the sludge in through the top of a multiple hearth furnace structure 12. If desired, the sludge before being admitted to the furnace structure may be passed through a thickening or decanting tank to increase the solid content.

As shown, the furnace structure 12 may comprise one or more hearths as at 13 of a substantially conical or other concaved shape, suitable for receiving and temporarily retaining liquid or semi-liquid material. A plurality of additional drying and incinerating hearths as at 14, 15, etc., substantially flat and horizontal, are preferably provided beneath the hearth or hearths 13.

As shown in the drawings, a plurality of rabbling arms or other suitable mixing devices may be provided above the hearth or hearths 13, so shaped and positioned as to mix the liquid or semi-liquid sludge on hearth 13 with solid material for absorbing the same, such as ashes, and for advancing the semi-solid or solid component of the mixture, as formed, toward the periphery of the hearth 13 where it may fall through peripheral openings as at 13' to the hearth below.

Such of the lower hearths as are designed to operate with solid or semi-solid material may be of a construction with accompanying rabbling means similar to the construction shown in the above mentioned Baird et al. patent. As also disclosed in said patent, the furnace may be provided with a central shaft 17 for rotatably carrying the rabbling and mixing arms, and the arms may be provided with internal cooling conduits as in said patent. Cooling air or the equivalent for the rabbling structure may be forced into the base of the shaft 17 as by blower 18 and out from the top of the central shaft through a conduit 18' running to a recuperator 19. The air or other gas thus preheated in the cooling conduits of the rabbling structure may be further preheated in the recuperator and then advanced by a blower 20 through conduit 21 to air intake ports as at 22, 23, 24 extending through the wall of furnace 12 at points such as to admit the hot air to the spaces above a plurality of the furnace hearths at which incineration is to be carried on.

While the sewage sludge under treatment in the furnace is rabbled successively over the various hearths and from hearth to hearth down through the furnace, there will be a countercurrent stream of preheated air flowing over the several hearths in succession up through the furnace and out through a gas outlet 25, conduit 26, and to the base of the recuperator 19. The hot exit gases from the furnace may thus be brought into heat exchanging relationship in the recuperator with the intake air or gases, so that the greater part of the heat of the furnace exit gases is removed before such gases are discharged from the recuperator to a stack 27.

The ash resulting from the incineration of the sludge within the furnace 12 may be rabbled out through an outlet 28 at the bottom of the furnace, through a chute to the base of a suitable well-known type of conveyor, as for example a bucket conveyor 29 for conveying the ash up to the top of the furnace. At the top of the furnace such ash may fall through a chute 30 to a screw conveyor 31 or other suitable means for introducing a desired portion of the ashes into the furnace through an inlet 32. The speed of rotation or operation of the screw conveyor 31 or equivalent means may be adjusted so as to feed the desired proportion of the ashes into the furnace, and at times when there is a larger supply of ashes than needed to provide the desired ash-sludge mixture in the furnace, then the excess of ashes may be conducted by a suitable conveyor 33, from a pocket at the base of chute 30 into an ash storage bin 34. At times when the supply of ash directly from the furnace is insufficient to provide the desired ash-sludge mixture in the furnace, then ashes may be allowed to fall from the storage bin 34 through an adjustable outlet 35 and conduit 36 into the furnace. From time to time, the excess quantities of ash accumulated in the storage bin may be withdrawn through an outlet 37 and carted away.

In some installations it may be found desirable to dispose of the municipal garbage and similar waste in conjunction with the incineration of the sewage. In that case garbage may be received in a bin 38 from which it is gradually discharged to a suitable well-known form of shredder 39 for grinding or shredding the garbage into relatively finely divided form. From this shredder the garbage may pass through a conduit 40 into the top of the furnace at a point where it will fall into and be mixed with the sludge on the hearth 13, thus aiding in the thickening of the sludge quickly to form a solid or semi-solid mixture.

As shown in Fig. 2, the construction of the lower part of the furnace 12 and the accompanying rabbling mechanism, may be similar to that disclosed in the above mentioned Baird et al. Patent 2,015,050. While in the drawings I have shown a construction having six drying and incinerating hearths below the hearths which receive the liquid, it will be understood that a greater or lesser number of drying and incinerating hearths may be provided depending upon the intended capacity of the equipment and the height of the space available therefor. In the particular example shown, the first two hearths below the liquid receiving hearth, namely hearths 14 and 15, may be provided with two pairs of rabble arms, or four rabble arms in all for each of these hearths, so that the material thereon is more frequently stirred or rabbled for prompt drying, whereas on the lower hearths, a single pair of rabble arms will ordinarily be sufficient at each hearth. It will be understood that the rabble teeth at each hearth are so arranged that the material will be rabbled inwardly, for example on hearth 14, toward a central discharge port as at 58 and on hearths such as at 15 the rabble teeth are at an angle such as to direct the material outwardly for discharge through peripheral openings as at 59. Similarly, the lower hearths may be alternately provided with central and peripheral discharge openings.

Oil burners as at 50 may be provided within or adjacent each of the preheated air intake ports 22, 23 and 24 and located, for example, at the bottom hearth and at one or two of the hearths at the mid portion of the furnace. The upper hearth or hearths 13 may differ in construction from the lower hearths, in that they are preferably formed with cavities of a generally conical shape as at 51 for receiving and temporarily retaining the incoming sludge in liquid or semi-liquid condition. The rabble arms as at 52 and 53 over the hearth 13 may be mounted at upwardly directed angles corresponding generally to the incline of the hearth surfaces whereby the rabble teeth 54 mounted on the arms may be all made of a uniform height to properly cooperate with the hearth. The central portion of the hearth 13 may be formed as an upwardly extending cylindrical portion 55 closely fitting the central shaft 17 and preventing the liquid sludge from running out through the middle of the hearth or down along the central shaft.

In operation the sludge is admitted to the top of the furnace structure through conduit 11 at an adjustable rate preferably sufficient to maintain a substantial body of liquid sludge in the hearth 13. At the same time an adjustable quantity of ash is admitted through the conduit 36 to be mixed with the sludge on the hearth 13. As portions of the mixture become semi-solid, the same are rabbled outwardly of the hearth 13. At the periphery of this hearth the solid or semi-solid material is thus rabbled out of the liquid sludge and the liquid is permitted to drain therefrom to some extent, after which the solid is rabbled through one or more of the peripheral hearth outlets 13' whereby it falls to the hearth below. Meanwhile, however, hot gases resulting from incineration taking place on lower hearths, are passed up through the openings 13' and are permitted to flow over the semi-solid material resting on the periphery of the hearth 13 as well as over the liquid within the hearth 13, and in contact with the liquid falling into the furnace, with the result that there is a substantial heat interchange between such hot gases and the liquid sludge. Thus considerable heat may be removed and saved from the hot furnace gases before they pass out through the gas outlet 25 and at the same time evaporation of the moisture from the sludge will be promptly initiated on hearth 13.

Due to the fact that the liquid sludge is continually being absorbed by the ash and the resulting mixture is rabbled over the periphery of the hearth 13, the surface areas from which evaporation of the sludge may take place from the mixture in the presence of the hot gases, will be considerably augmented and will be repeatedly and frequently changed. Thus the heating of the sludge and evaporation of moisture therefrom will proceed rapidly, uniformly and efficiently, and there will be no opportunity for the sludge to accumulate in cakes. It will remain in finely divided form ready for uniform and thorough drying and incineration on the lower hearths.

The sewage sludge and other waste materials mixed therewith, will ordinarily become sufficiently dry either on hearth 15 or on a lower hearth 60, so that combustion may be initiated. Combustion may continue on hearths 60—62 and possibly to some extent on the bottom hearth 63, after which the resulting ash may be somewhat cooled as it travels toward the periphery of the bottom hearth 63 and before it is discharged through the outlet 28.

It will be apparent that with the above construction a unitary furnace assembly is provided for efficiently incinerating sewage sludge even in cases where the sludge may have such an excess of water that it will flow or may be pumped. Yet the necessity of preliminarily dewatering the sludge by filtering and the addition of relatively expensive chemicals for aiding the filtering operation, are eliminated. The several provisions above referred to for economizing in the use of heat are adequate to insure efficient incineration without excessive expenditures for fuel at the oil burner. The hot gases arising from the hearths where incineration takes place are of a temperature sufficiently high to eliminate odor from the gases and vapor passing out of the top of the furnace. The process according to which the sewage sludge is finally dried and incinerated, is set forth in further detail in the above mentioned Baird et al. patent.

As above indicated, the ash from the bottom of the furnace or a large part of it, is preferably rapidly conducted to the top of the furnace and introduced into the furnace again while still at a relatively high temperature. Thus some of the heat of the ash may be saved and used to aid in promptly starting evaporation of moisture from the sludge mixture.

In cases where a larger volume of sludge is to be treated, one or more additional hearths similar to hearth 13 may be provided for receiving the sludge in liquid or semi-liquid form and temporarily retaining the sludge in such form until it is mixed with sufficient ash or preliminarily dried to the extent that it is in solid form suitable for further rabbling, drying and incineration on the lower hearths. It will be understood that if another hearth of concave shape is used just beneath the hearth 13, it should preferably be arranged to be inclined outwardly with a discharge opening at the center and with the greatest depth of the cavity around the periphery. In other words, throughout the furnace alternate hearths are preferably arranged respectively with peripheral and central discharge openings. Sufficient fuel is burned at the lower hearths so that the hot gases upon arriving over the liquid sludge at the top hearth, are at a temperature in the neighborhood of 1,100° F. or above, whereby substantially all odoriferous gases evolved from the material will be decomposed and the exit gases from the furnace will be substantially free of odor.

Under some circumstances it may be found preferable, particularly where the height of the space available for the apparatus is limited, to provide means for mixing the liquid sludge with the ashes or the like, in a separate device at a point outside the furnace walls. In that event the sludge-ash mixture may be conveyed from such mixing device directly into the top of the furnace for drying and incineration on a plurality of hearths such as hearths 14, 15, 60—63. In some cases, especially where it may be found desirable to provide several of the liquid retaining hearths, such as hearth 13, practically all of the useful heat of the gases rising from the incineration hearths may be absorbed by passing such gases over a series of the hearths containing the liquid sludge. In that event the recuperator may be omitted and the preheated air from the conduit 18' may be admitted directly to the furnace through the ports as at 22, 23, 24. Also, under some circumstances, it may be found desirable to omit the step of reintroducing the ash to initially form a solid or semisolid sludge mixture, particularly where sufficient hearth area or a sufficient number of the hearths 13 are provided to permit enough of the water content to be evaporated by the hot furnace gases without resorting to absorbing the sludge with ash.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent, is:

1. Apparatus for drying and incinerating a substantially liquid waste material, comprising a furnace having a plurality of superposed hearths, including an upper hearth having a cavity for receiving and temporarily retaining substantial quantities of the material, means for introducing the material onto said upper hearth, a plurality of lower hearths with substantially horizontal surfaces for receiving the material in semi-solid or solid forms, means for providing a flow of gases and air over said lower hearths at a temperature sufficient to dry and then incinerate the material thereon, a rotatable shaft extending up through the furnace, rabbling means on said shaft at each hearth, alternate hearths respectively being provided with peripheral and central discharge openings permitting the material to pass from hearth to hearth down through the furnace and permitting the hot gases of the lower hearths to rise into contact with the material on said upper hearth, means for conveying ash from a lower hearth onto said upper hearth, said rabbling means including members for mixing said ash with the material on said upper hearth and gradually thrusting the mixture from said upper hearth, for thereby separating the same from the liquid and discharging it to the lower hearths.

2. Apparatus for drying and incinerating waste material of high water content, comprising a furnace having a plurality of superposed hearths, means for conveying hot gases over said hearths in contact with the material thereon, means for mixing ash with said material on an upper hearth to form a mixture which is at least semi-solid and for depositing said mixture on a succeeding hearth, means for rabbling such mixture over the remaining hearths and down through the furnace while the material is being dried and then burned, means for conveying ash from the lower part of the furnace and feeding at least a portion of such ash onto said upper hearth, means for conveying excess of ash not directly fed onto said upper hearth to storage, and means for also feeding ash from such storage to said upper hearth.

3. Apparatus for drying and incinerating waste material of high water content, comprising a furnace having a plurality of superposed hearths, means for conveying hot gases over said hearths in contact with material thereon, a receptacle within the top of said furnace for receiving and retaining substantial quantities of said material when in substantially a liquid condition, means for mixing ash with said material in said receptacle and for gradually discharging from said receptacle such of the resulting mixture as is in at least semi-solid condition and for depositing the same on an upper hearth of said furnace, means for rabbling the mixture over said upper hearth and discharging the same to a lower hearth while said gases cause substantial amounts of moisture to be evaporated from the mixture, means for then rabbling the mixture over a lower hearth or hearths while the waste material is being incinerated, and means for conveying ash resulting from such incineration to said receptacle to provide a source of supply of said ash for the mixture.

4. Apparatus for drying and incinerating waste material of high water content, comprising a furnace having a plurality of superposed hearths, means for conveying hot gases over said hearths in contact with material thereon, means within the top of the furnace for mixing ash with said material to form a mixture which is at least semi-solid and for depositing said mixture on an upper hearth of said furnace, means for rabbling said mixture over said upper hearth and discharging the mixture to a lower hearth while said gases cause substantial amounts of moisture to be evaporated from the mixture, means for rabbling the mixture over a lower hearth or hearths while the waste material of the mixture is being incinerated, and means for conveying at least a portion of the ash resulting from such incineration to said mixing means to provide a source of supply of ash for the mixture.

5. Apparatus for drying and incinerating waste material of high water content, comprising a furnace having a plurality of superposed hearths, means for conveying hot gases over said hearths in contact with material thereon, means for mixing hot ash with said material to form a mixture which is at least semi-solid and for depositing said mixture on an upper hearth of said furnace, means for rabbling said mixture over said upper hearth and discharging the mixture to a lower hearth while said gases cause substantial amounts of moisture to be evaporated from the mixture, means for rabbling the mixture over a lower hearth or hearths while the waste material of the mixture is being incinerated, and means for conveying ash resulting from such incineration, while still hot, to said mixing means to provide a source of supply of said hot ash for the mixture, and to provide heat for said mixture to aid said evaporation of moisture.

6. The continuous process of drying and incinerating waste material to form an ash substantially free of organic matter and evolved gases free of noxious odor, which comprises substantially continuously introducing and retaining quantities of the material when in substantially liquid form in an enclosed heated zone, mixing at least a portion of said ash with the material within said zone whereby portions of the mixture gradually become solid or semi-solid, then gradually advancing such portions from said zone and through a plurality of succeeding zones, temporarily retaining the mixture in substantially horizontal layers in each of said succeeding zones while periodically agitating and advancing it through each zone and from zone to zone in the presence of streams of hot gases, whereby the material is subjected to a temperature sufficient to eliminate therefrom substantially all of the organic matter, and sufficient to substantially destroy noxious gases evolved from the material, and conveying resulting ash to said enclosed heated zone to provide a source of ash supply for said mixing step.

7. The process of drying and incinerating sewage sludge of high moisture content to form an ash substantially free of organic matter, which comprises introducing and retaining quantities of the sludge when in substantially liquid form in an enclosed zone, mixing sufficient of said ash with the sludge within said zone whereby portions of the mixture gradually become solid or semi-solid, then gradually advancing such portions from said zone and into and through a plurality of succeeding zones, temporarily retaining the mixture in substantially horizontal layers in each of said succeeding zones while periodically agitating and advancing it through each zone and from zone to zone in the presence of streams of hot gases, whereby the mixture is subjected to temperatures sufficient to first dry and then burn therefrom substantially all of the organic matter, and conveying at least a substantial portion of the resulting ash to said enclosed zone to provide a source of ash supply for said mixing step.

8. The process of drying and incinerating waste material to form an ash substantially free of organic matter, which comprises introducing and retaining quantities of the material when in substantially liquid form in an enclosed zone, mixing substantial amounts of said ash with the material within said zone, whereby portions of the mixture gradually become solid or semi-solid, then gradually advancing such portions from said zone and through a plurality of succeeding zones, temporarily retaining the mixture in extended and relatively thin layers in each of said succeeding zones while periodically agitating and advancing it through each zone and from zone to zone in the presence of streams of hot gases, whereby the material is subjected to temperatures sufficient to first dry the mixture and then burn therefrom substantially all of the organic matter, and conveying the resulting hot ash to said enclosed zone to provide a source of ash supply for said mixing step and to supply heat to said mixture.

9. The process of disposing of sewage and garbage to form an ash substantially free of organic matter, which comprises suitably treating the raw sewage to form a relatively thick liquid sludge, treating the garbage to reduce the same to a relatively finely divided form, introducing and mixing said liquid sludge and treated garbage in an enclosed heated zone, introducing sufficient of said ash into said zone whereby portions of the mixture gradually become solid or semi-solid, then gradually advancing such portions into said zone and into and through a plurality of succeeding zones, temporarily retaining the mixture in substantially horizontal layers in each of said succeeding zones while periodically agitating and advancing it through each zone and from zone to zone in the presence of streams of hot gases, whereby the mixture is subjected to temperatures sufficient to first dry and then burn therefrom substantially all of the organic matter, and conveying at least a substantial portion of the resulting ash to said enclosed zone to provide a source of ash supply for said mixing step.

HENRY J. HARTLEY.